United States Patent [19]
Fujimura et al.
[11] Patent Number: 4,737,803
[45] Date of Patent: Apr. 12, 1988

[54] THERMAL ELECTROSTATIC INK-JET RECORDING APPARATUS

[75] Inventors: Yoshihiko Fujimura; Koichi Saito; Eiichi Akutsu; Nanao Inoue; Kiyoshi Horie, all of Kanagawa, Japan

[73] Assignee: Fuji Xerox Co., Ltd., Tokyo, Japan

[21] Appl. No.: 70,817

[22] Filed: Jul. 7, 1987

[30] Foreign Application Priority Data

Jul. 9, 1986 [JP] Japan ................................ 61-159713
Jul. 9, 1986 [JP] Japan ................................ 61-159714

[51] Int. Cl.[4] ............................................ G01D 15/16
[52] U.S. Cl. .................................. 346/140 R; 346/75; 346/1.1; 400/126
[58] Field of Search .................... 346/1.1, 140 PD, 75; 400/126

[56] References Cited

FOREIGN PATENT DOCUMENTS 56-37163 4/1981 Japan .
0024261 2/1982 Japan .................................... 346/75
0179663 10/1983 Japan .................................... 346/75
0090775 5/1985 Japan ........................... 346/140 PD

*Primary Examiner*—E. A. Goldberg
*Assistant Examiner*—Hyan H. Tran
*Attorney, Agent, or Firm*—Finnegan, Henderson, Farabow, Garrett and Dunner

[57] ABSTRACT

Disclosed is a thermal electrostatic ink-jet recording apparatus comprising a head body provided with an ink chamber, electrodes for selectively applying heat, in response to image signals to each of discrete ink unit areas corresponding to pel density, and electrodes for producing a predetermined electrostatic field between an ink surface and a recording sheet so as to jet the heated ink unit areas by applying the electrostatic field, in which electric current is passed through an organic resistance film to heat the ink.

12 Claims, 7 Drawing Sheets

THERMAL ELECTROSTATIC INK-JET RECORDING APPARATUS

FIELD OF THE INVENTION

The present invention relates to an ink-jet recording apparatus, and, more particularly, relates to an improvement in an ink-jet recording apparatus wherein ink is jetted by use of both thermal and electrostatic energies.

BACKGROUND OF THE INVENTION

Conventional ink-jet recording devices have jet-openings, or orifices, arranged to correspond to the desired pel density. Such devices have ink contained in a chamber communicating with the openings or orifices, and employ pressure pulses which are selectively applied to jet the ink from the corresponding jet-openings onto paper.

In apparatus of this type, it is necessary to set the volume ratio of each orifice at a relatively high value in order to maintain the ink jetting capability of the orifice. Thus, it is difficult to miniaturize the ink jetting devices. Also, it is necessary to set the pitch, or interval between adjacent jet-openings, at a relatively high value, so that the image recording density cannot be high. Further, recording speed is lowered because mechanical scanning is employed to apply the pressure pulses used to jet the ink.

In order to solve such problems, various structures, such as the following, have been proposed. A first system, the magnetic ink-jet system, provides magnetic ink in the vicinity of an array of magnetic electrodes, and ink jetting is accomplished at a corresponding image density by use of a magnetic field applied to the meniscus of the ink. The magnetic ink is then jetted toward a recording sheet by use of a patterned electric field formed between the electrode array and an electrode disposed opposite the array on the other side of a recording sheet (Japanese Patent Unexamined Publication No. 37163/1981).

In addition to the aforesaid methods, the so-called plane ink jet method is also well known. This method, involves arranging ink in a slitlike inkholder in parallel to an electrode array, and jetting the ink in accordance with an electric field pattern formed between an electrode facing the electrode array so that ink droplets selectively impact upon an intervening recording paper. Since no minute orifice for storing ink is required in this method, ink clogging can be prevented. However, a high voltage must be applied to jet the ink droplets which makes it necessary to drive the electrode array on a time division basis to prevent a voltage leak across the adjoining or neighboring electrodes. Consequently, the recording speed is limited.

Another system, the thermal bubble-jet system, uses apparatus wherein heat is rapidly applied to the ink to cause film-surface boiling. The ink is then jetted from an orifice by the pressure increase caused by the rapid growth of bubbles within the orifice (Japanese Patent Unexamined Publication No. 1611664/1980).

In the ink-jet recording systems described above, high-density recording can be made, and because electrical scanning can be carried out, high-speed recording can be achieved in most systems. However, in the magnetic ink-jet system, it is necessary to use ink containing magnetic powder which causes the ink to be black and makes it difficult to reproduce a color picture by superimposing several colors of ink to form an image. The plane scanning ink-jet system is disadvantageous in that it is necessary to apply a high voltage to jet the ink. Therefore, time division driving of the electrode array is required to prevent voltage leakage between adjacent electrodes. This is unsuitable for high-speed recording. Furthermore, in the apparatus using the thermal bubble-jet system, it is necessary to apply heat rapidly to cause film-surface boiling, resulting in thermal deterioration of the protective layer applied to the resistance heaters used to heat the ink.

The present invention provides a thermal electrostatic ink-jet recording apparatus in which thermal energy, corresponding to image information, is selectively applied to the recording ink in an electric field and the heated ink portions are jetted toward a recording sheet by use of a predetermined electrostatic field.

In apparatus of this latter type, magnetic ink used in the magnetic ink-jet system is not required. Accordingly, not only can color imaging be easily attained by superimposing several kinds of ink during printing, but also voltage leakage in the vicinity of the electrode array can be effectively prevented because the extremely high intensity electric field required in the plane ink-jet system (in which ink is jetted only by an electrostatic field) is not required for jetting ink. Furthermore, the quantity of thermal energy can be reduced because the very large thermal energy required in the bubble-jet method (in which ink is jetted only by thermal energy) is not required for jetting ink. Accordingly, thermal deterioration of ink can be effectively prevented, and high-speed, high-density recording can be accomplished while effectively eliminating the above defects in conventional apparatuses.

In such a thermal electrostatic ink-jet recording apparatus, an exothermic array, composed of a plurality of electrical resistance heating elements that are disposed at intervals corresponding to pel density, is used as means for applying thermal energy to the ink. The array of heaters is provided at an edge portion of the ink-jet recording head in the vicinity of an orifice in the ink reservoir located in the head body, so that ink within the ink reservoir is indirectly heated. In this case, an insulating substrate constituting one side wall of the ink reservoir is subjected to a photolithographic process or the like to form the array of heating elements.

While the thermal electrostatic ink-jet printer above has been found to be very effective, it is difficult in producing the exothermic array to arrange the heating elements in the vicinity of the orifice side end portion of the insulating substrate while maintaining the array in a plane. Generally, it is required that the exothermic array be arranged a certain distance apart from the the edge portion of the insulating substrate, and then the end portion of the substrate is cut so as to properly position the exothermic array relative to the edge portion of the insulating substrate. Further, in order to keep recording image quality good it is necessary to stabilize the jetting of the ink. Formation of a stable ink meniscus is one of the means for stabilizing the jetting of the ink. In the conventional apparatus, however, it happens that the surface of the end portion is rough because the end portion of the head body is cut, as described above. Therefore, it is necessary to polish the surface of the end portion to make the surface satisfactorily smooth. In short, a problem exists in that the process of producing the head body is troublesome and sometimes not effective.

Furthermore, since the exothermic array is attached or fixed onto the insulating substrate, the heat from the heating resistors naturally escapes toward the insulating substrate, resulting in a problem that the efficiency of heat transmission to the ink becomes correspondingly poor.

OBJECTS AND SUMMARY OF THE INVENTION

An object of the present invention is to solve the problems described above.

Another object of the present invention is to provide a thermal electrostatic ink-jet recording apparatus which is easier and more efficient to produce, as well as providing greater efficiency of thermal transmission to ink, while at the same time utilizing the innate advantages in the thermal electrostatic ink-jet system.

In order to attain the above objects, according to one aspect of the present invention, the thermal electrostatic inkjet recording apparatus comprises a recording head body having an orifice side and a back side; first and second spaced apart wall members in the body defining an ink chamber for accommodating ink therein, the first wall member being on the orifice side and the second wall member being on the back side of the head body, and one of the wall members comprising an electrically conductive organic resistance film; orifice means in one of the wall members in flow communication with the chamber for jetting ink therefrom; thermal energy applying means for applying thermal energy to selected portions of the ink adjacent the orifice means in response to image signals, including a plurality of spaced apart electrical current conducting electrodes in contact with the film to pass an electric current through the film and thereby heat selected areas of the ink in response to image signals; and electrostatic field applying means for applying an electrostatic field between the ink and a recording sheet to jet the ink from the orifice means.

In one embodiment of the apparatus described above, the said first wall member comprises the organic resistance film which has an ink-jet orifice means for jetting the ink contained in the head body from the side opposite a recording sheet. In this case, the ink-jet orifice means may be constituted by holes in the film corresponding pel density or by a slit having a pre-determined width. The construction using the holes is advantageous for precisely defining the ink-jet orifice into ink unit areas corresponding to image elements, and the construction using a slit is advantageous for preventing blockage with ink.

An organic resistance film material capable of producing heat by electrical current conduction is employed in the thermal energy applying means. It is necessary that electrical signals corresponding to image information, or image signals, are selectively applied to the respective current-conduction electrodes provided on the unit orifice edge portions of the ink-jet orifice means in the organic resistance material corresponding to the ink unit areas, so that the respective edge portions function as heating portions. In this case, in order to provide greater efficiency of thermal transmission to ink, it is preferable that a portion of each of the current conduction electrodes, other than the ink-jet orifice edge portion, is insulated from the organic resistance film.

Further, the electrostatic field producing means may be freely modified in any manner as long as such means can produce an electrostatic field of such a magnitude that heated ink between the surface thereof and the recording sheet can be jetted onto the recording sheet.

Furthermore, the ink used in the practice of the present invention may be freely selected as long as the ink can be brought into a state in which the ink can be jetted when a predetermined level of thermal energy is applied.

In order to satisfactorily jet the ink, it is necessary to lower the viscosity and surface tension of the ink to such values that the ink can be jetted by the action of the electrostatic field, and it is necessary that the ink have a suitable conductivity.

The organic resistance film constituting the recording sheet side portion of the head body is made of a suitably selected, electrically conductive resin material that contains suitable electrically conductive powder, usually in the range from about 20 to about 80 weight percent, and has a volume resistivity of about 0.01 to $10^4$ ohms/cm. The resin material may be selected from the group of aromatic polyamide, polyimide, polysulfone, polyphenylene oxide, polycarbonate and polyester polymers and various kinds of fluorinated polymers. The electrically conductive powder may be selected from the group of metal fine powders such as Ni, Cu, Ag or the like; metal oxides such as $SnO_2$, $ZnO$, $Fe_2O_3$ and the like; carbon; and the like.

As mentioned above, when an electrical signal corresponding to image information is applied to selected one or ones of the current-conduction electrodes, the unit opening edge portion or portions of the organic resistance film are directly electrically heated, so that the ink unit area or areas facing the orifice side unit opening edge portion or portions are heated. As the result, the viscosity and surface tension of the thus heated ink unit area or areas are lowered, and the conductivity thereof is increased. Accordingly, the heated ink unit area or areas are brought to a condition where it is possible to jet the ink, and then the heated ink in such unit area or areas is jetted toward the recording sheet by the electrostatic attraction force resulting from the electric field acting on the ink surface. The end portion of the resultant projecting ink column or columns come into contact with the recording sheet, so that an ink dot or dots can be formed by the transfer of ink to the recording sheet.

In another embodiment of the present invention, the organic resistance film is in the second wall member on the back side of the head body opposite the orifice side. The ink-jet orifice means is located in the first wall member on the orifice side opposite a recording sheet. The current conduction electrodes are provided on the second wall member at locations corresponding to the ink unit area to heat selected areas of the organic resistance film corresponding to the respective ink unit areas in response to image signals. The operation of the above-described second embodiment of the invention is the same as previously described.

DETAILED DESCRIPTION OF THE PREFERRED EMBODIMENTS

Figure 1:
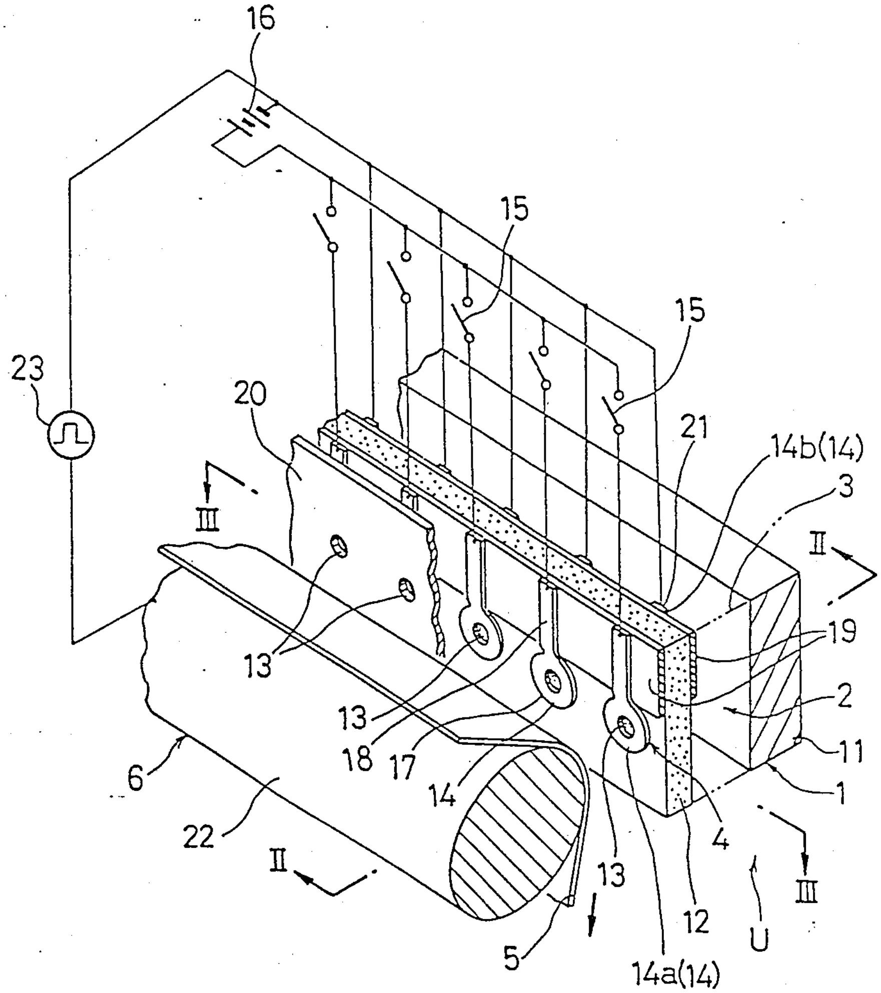
FIG. 1 is a perspective view showing a first embodiment of the ink-jet recording apparatus according to the present invention.
Figure 2:
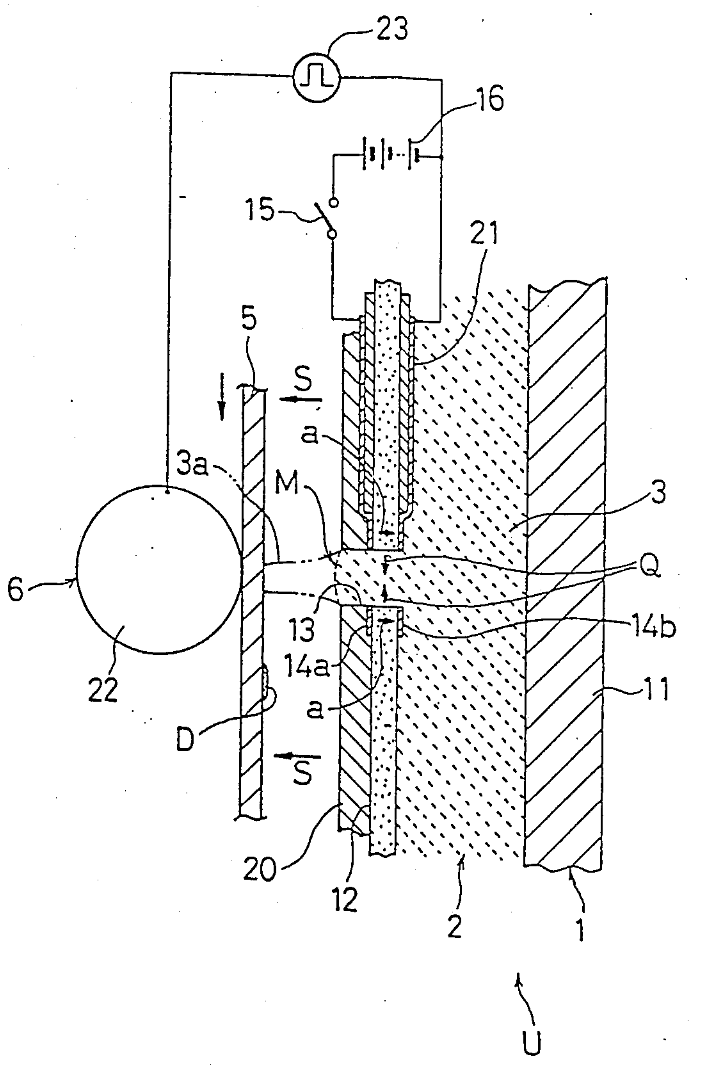
FIG. 2 is a sectional view taken along the line II—II of FIG. 1.
Figure 3:
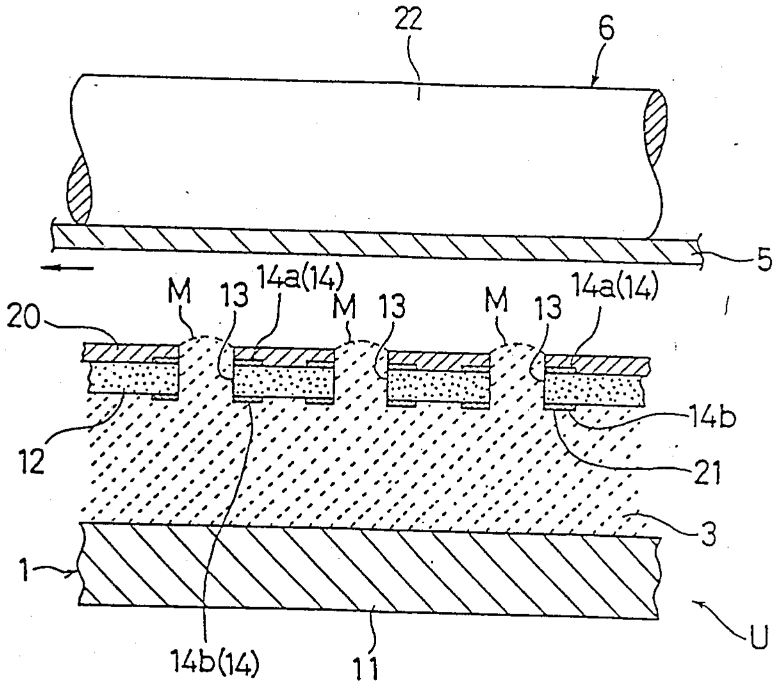
FIG. 3 is a sectional view taken along the line III—III of FIG. 1.

FIGS. 1 through 3 show a first embodiment of the inkjet recording apparatus according to the present invention. The apparatus has a head body 1 provided with an ink chamber 2 acting as an ink reservoir, a thermal energy applying means 4, for applying a predetermined level of energy thermal to the ink 3, and an electrostatic field producing means 6 for producing a predetermined electrostatic field between a surface of the ink 3 and a recording sheet 5.

In this first embodiment, the head body 1 includes a second wall member 11 made of an insulating material such as a ceramic, e.g., alumina, or the like, and a first wall member formed of an electrically conductive organic resistance plate or film 12, both members 11, 12 defining the box-like ink chamber 2. The organic resistance film 12, may be, for example, a conductive polyimide film of a thickness of about 30 μm, containing 48% by weight of carbon in polyimide and having a volume resistivity of about 1 ohm/cm. The organic resistance film 12 is provided with ink-jet orifice means through which ink is jetted from the recorder head onto a recording sheet. For example, holes 13 may be formed at a spacing corresponding to a selected pel density (for example, six holes per millimeter with a hole size of 100 μm).

The ink 3 is supplied into the the ink chamber 2 with appropriate pressure by an ink supply means (not shown), so that each of the holes 13 is filled with the ink 3 by capillary action. In this embodiment, the ink 3 supplied into the ink chamber 2, may for example, be a conductive ink having a volume resistivity not larger than about $10^7$ ohms/cm is used, and the viscosity of the ink 3 is established so as to have a value which is within a range from about 20 to about 300 cps at ordinary temperature (20° C.) but which is reduced substantially when heated (for example at 200° C.).

The ink-jet orifice means is constituted by a series of holes, or a slit, in one of the wall members for jetting the ink, and may also include corresponding openings in the electrodes, insulating layers, etc., through which the ink is jetted.

The thermal energy applying means 4 is constituted by the organic resistance film 12, one or more pairs of current-conduction electrodes 14 (see pair 14*a* and 14*b*) provided on opposite sides of film 12 adjacent the edge portions of each of the holes 13 in the organic resistance film 12, a switching element 15 interposed between each pair of current-conduction electrodes 14 for the purpose of performing switching operation corresponding to electrical image signals, and a current-conduction electric power source 16 connected in series to each of the switching elements 15. In this first embodiment, each of the current-conduction electrodes 14 is constituted by an annular portion 17 having an outer diameter of about 150 μm and disposed around the hole 13, and a linear portion 18 extending from the annular portion 17. The annular portions 17, are provided in pairs on opposite sides of the film 12, and directly contact the surfaces of the organic resistance film 12. The linear portions 18, are also provided in pairs and are separated from the organic resistance film 12 by an insulating layer 19, made of $SiO_2$ or the like. A second insulating film 20 of about 10 μm thick is made of $SiO_2$ or the like, and is provided to cover the sheet side surface of the organic resistance film 12 and electrodes 14.

The production of the current-conduction electrodes 14 and the insulating film 20 is described more in detail. For example, the process of production comprises the steps of forming an insulating layer 19 by sputtering $SiO_2$ or the like on the opposite surfaces of the organic resistance film 12 except the areas adjacent the holes 13, depositing a metal layer through evaporation with metal such as Cr, Cu, Al, Au, or the like, onto the insulating layer 19, forming the metal layer into current-conduction electrodes 14 of the above-described pattern through a photolithographic process, forming an insulating film 20 through sputtering, and simultaneously forming the holes 13 through all of the above layers by means of a laser, microdrill, plasma processing, or the like.

The electrostatic field producing means 6 is constituted by electrically conductive layers 21 employing the respective current-conduction electrodes 14*b*, a roll-like electrostatic induction electrode 22 disposed at a predetermined distance apart from the surface of the ink 3 and functioning as a surface for supporting the recording sheet 5, and an electrostatic induction electric power source 23 connected to each of the conductive layers 21 and the electrostatic induction electrode 22 for the purpose of forming an electrostatic field from the surface of the ink 3 to the electrostatic induction electrode 22. In this embodiment the electrostatic control pulse to be applied to the electrostatic induction electrode 22 from the electrostatic induction electric power source 23 is generated in synchronism with the drive pulse for the thermal energy applying means.

In the first embodiment, the ink-jet recording apparatus according to the present invention operates as follows. When the switching elements 15 are selectively turned on corresponding to image signals, or information of an image to be recorded, a current a flows through film 12 adjacent the edge portion of the hole 13 through the associated conduction electrodes 14 in pairs as shown in FIG. 2. The edge portions defining the hole 13 is directly heated by the current a, so that thermal energy Q is applied to the ink unit area M facing the hole 13 to heat the ink unit area M to the desired temperature. As the result, in the heated ink unit area M, the viscosity and surface tension of the ink 3 are reduced and the conductivity is increased. When an electrostatic control pulse is applied to the electrostatic induction electrode 22 of the electrostatic induction producing means 6 in synchronism with the drive pulse for the thermal energy applying means 4, an electrostatic field S of a predetermined strength is formed between the ink 3 facing the conductive layer 21 and the electrostatic induction electrode 22. Due to the electrostatic field S, the heated ink unit area M is jetted toward the recording sheet 5 positioned in front of the electrostatic induction electrode 22. At this time, a protruding end portion of an ink column 3*a* caused by the jetting operation of the ink as shown by the dashed line of FIG. 2 touches the recording sheet 5, so that the ink 3 is transferred to the recording sheet 5. Thus, an ink dot D is formed on the recording sheet 5.

The process of the recording operation in the first embodiment has several advantages. First, because the edge portion defining the hole 13 is directly heated by electric power, the ink unit area M facing the through hole 13 can be directly heated. Secondly, because the organic resistance film 12 acting as a heating material has no substrate for supporting an array of heating elements, the thermal energy generated from the organic resistance film 12 does not escape toward the substrate. Thirdly, because the edge portion of the hole 13 is defined as a cylindrical surface, the heating area can be relatively enlarged compared with a heating resistance material disposed in a plane. In view of these advantages, the transmission efficiency of heat to the ink unit area M is improved compared with a system using an exothermic array.

To establish the superiority of the recording system of the present invention, several experiments were conducted. An electrostatic control pulse of 1000 V/300 μm for 0.5 ms was generated in synchronism with a drive pulse of 7 V for 0.5 ms, corresponding to image signals. As the result, the recording operation could be made stably with the repeated frequency kept at 500 Hz. Furthermore, it was found that the thermal energy electric power was about 0.1 W per dot.

The process of producing the heat body unit U of the first embodiment of the ink-jet recording apparatus is as follows. The ink-jet holes 13 are formed through the organic resistance film 12. The power electrodes 14 are arranged at the edge portions of each of the respective holes 13. The outer surface of the organic resistance film 12 is coated with the insulating film 20. The organic resistance film 12 constructed as described above is joined onto the box-like base member 11 with an adhesive. In the head body unit U, the edge portion of each of the holes 13 of the organic resistance film 12 functions as a heating portion. Accordingly, the conventional process of cutting a substrate for arranging exothermic resistance materials at the edge portion is no longer necessary.

The surface roughness of the organic resistance film 12 may be reduced to a very small value in the production process. The surface roughness of the insulating film 20 positioned on the organic resistance film 12 can be likewise reduced. Consequently, the step of polishing the edge surface of the head body 1 can be omitted, and the number of steps necessary to produce the head body unit U is reduced compared wtih the prior art process. As a result, the efficiency of the production process can be improved. Furthermore, because the surface roughness of the edge surface of the head body 1 can be satisfactorily reduced, the meniscus of ink in the ink unit area M facing the through hole 13 can be maintained in a stable condition.

In this first embodiment, the organic resistance film 12 is formed of polyimide or other suitable organic resin film having adequate strength and elasticity. Accordingly, if the organic resistance film 12 is expanded by heat or deformed by a shock or a load, the deformation can be absorbed to a certain extent due to its elasticity. In the case where the organic resistance film 12 is joined to the stiff base member 11 acting as one member of the head body 1, a satisfactory seal and adherence therebetween can be maintained.

Furthermore, because the insulating film 20 is provided on the outer surface of the organic resistance film 12, electric discharge between the current-conduction electrode 14 and the electrostatic induction electrode 22 can be effectively prevented from occurring, and at the same time, the distance between meniscus of the ink within the hole 13 and the electrostatic induction electrode 22 can be maintained by the thickness of the insulating film 20. Accordingly, the intensity of electrostatic field S acting on the meniscus of ink becomes large enough so that the induction of electrical charge on the meniscus of ink can be easily achieved.

Figure 4:
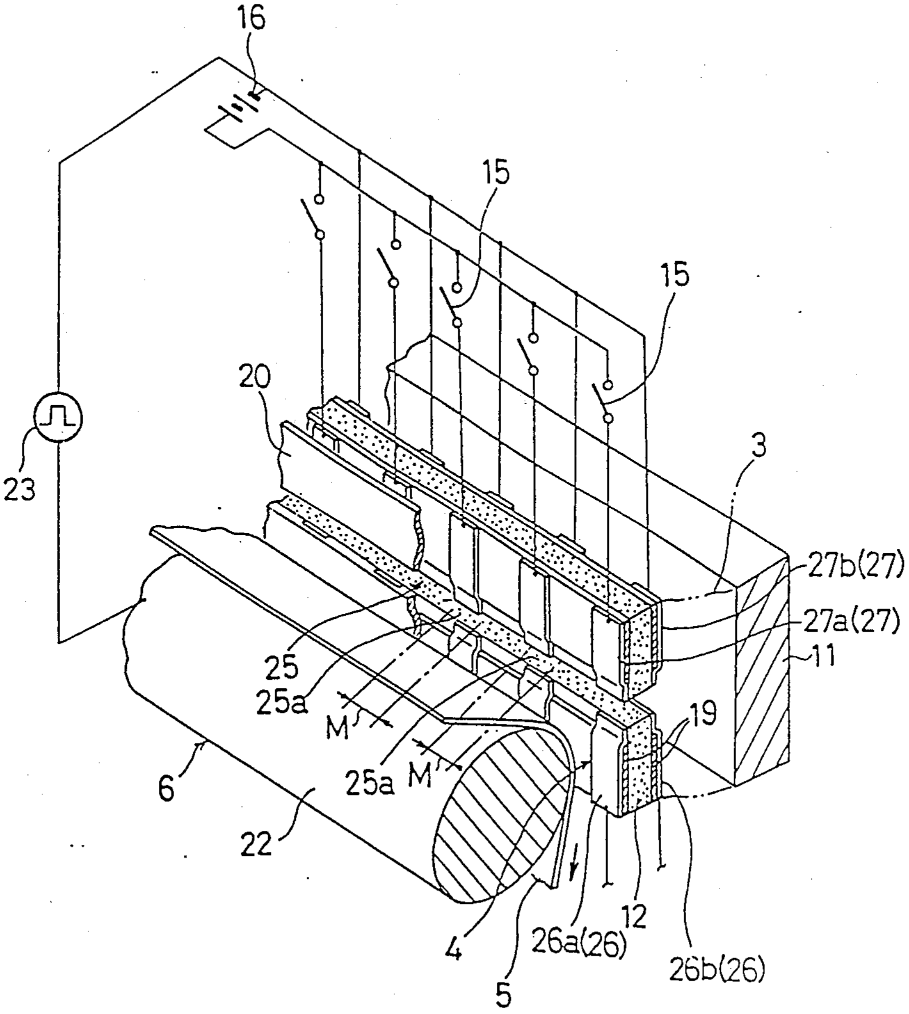
FIG. 4 is a perspective view showing a modification of the ink-jet recording apparatus according to the first embodiment of the present invention.

Although the holes 13 are used as orifices for jetting the ink in the first embodiment, the invention is not limited thereto. For example, the invention may be modified as shown in FIG. 4. This modification is characterized in that a slit 25 having a width corresponding to the size of an image element is provided in the organic resistance film 12, and pairs of spaced apart current-conduction electrodes 26 (specifically 26*a* and 26*b*) and pairs of spaced apart current-conduction electrodes 27 (specifically 27*a* and 27*b*) are provided at the opposite edge portions of respective unit jet orifices 25*a* of the slit 25, each arranged to provide ink unit areas M corresponding to pel density. In short, in the modification, the edge portions of each of the unit jet-openings 25*a* are electrically heated through the associated current-conduction electrodes 26 and 27. In the modification, separate orifices directly defining each of the ink unit areas M are not necessary, so that clogging of small orifices by dried ink can be effectively prevented compared with the first-described embodiment.

Although the first embodiment described the use of an organic resistance film made of a conductive polyimide resin film having predetermined conductivity and volume resistivity, the invention is not limited to this, and other suitable films may be used, for example, an organic resistance film made of a resin film about 20 μm thick where the resin film contains 40% by weight of carbon in polycarbonate resin and has a volume resistivity of 30 ohms/cm, or an organic resistance film made of an about 50 μm polyester resin film containing about 20% by weight of $SnO_2$ and having a volume resistivity of about $3\times10^3$ ohms/cm. In such cases, the same result can be attained.

Other than that described above, various modifications of the first embodiment may be made. For example, it is not necessary that each of the holes 13 be formed linearly but they may be in a zigzag or inclined pattern. Further, the array of the current-conduction electrodes 14 on one side may be replaced by a common electrode, and the conductive layer 21 of the electrostatic field producing means 6 may be provided separately from the one side current-conduction electrode 14*b*.

Figure 5:
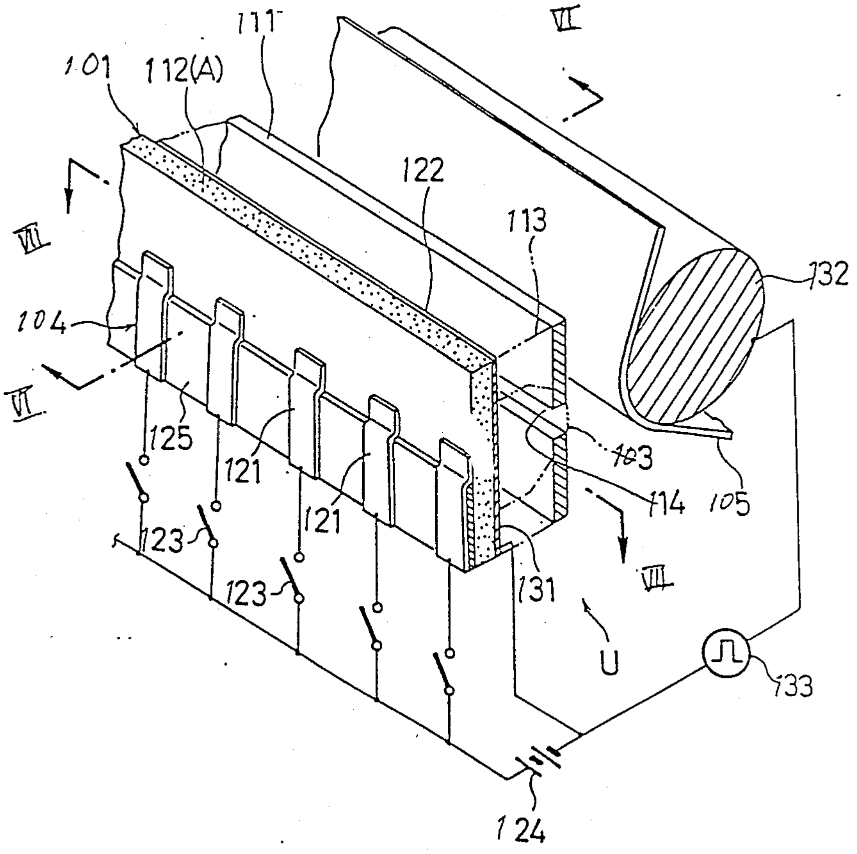
FIG. 5 is a perspective view showing a second embodiment of the ink-jet recording apparatus according to the present invention.
Figure 6:
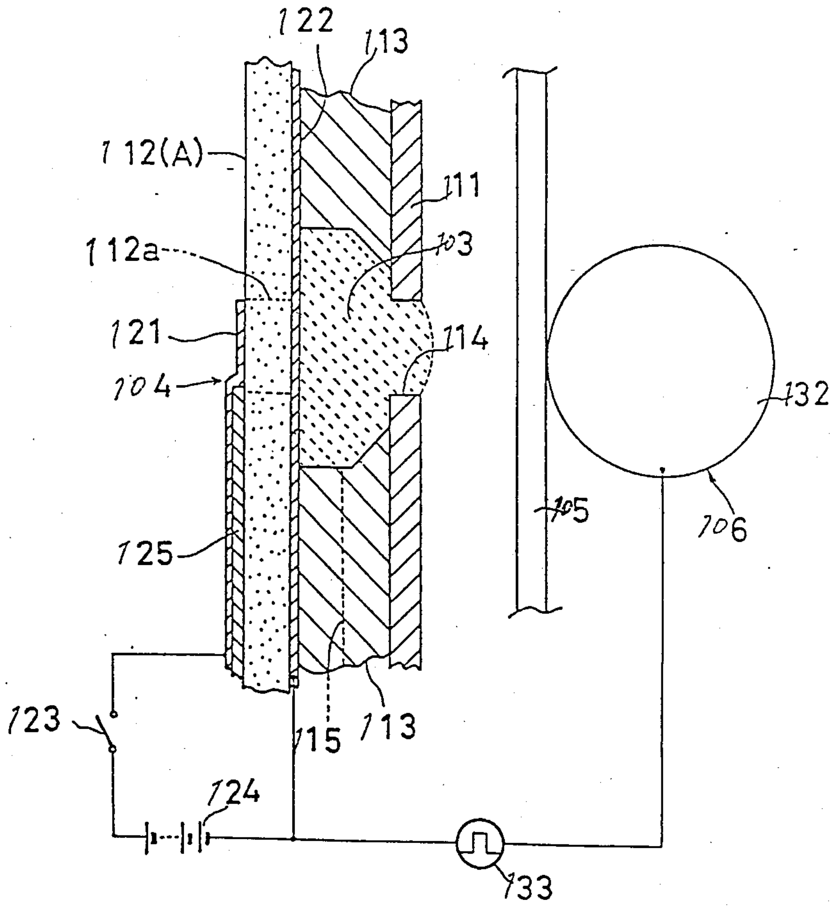
FIG. 6 is a sectional view taken along the line VI—VI of FIG. 5.

FIGS. 5 and 6 show a second embodiment of the ink-jet recording apparatus of the present invention. The apparatus has a head body 101 provided with an ink chamber 102, a thermal energy applying means 104 for applying a thermal signal to ink 103 provided within the ink chamber 102, and an electrostatic field producing means 106 for producing a predetermined electrostatic field between a surface of the ink 103 and a recording sheet 105.

In this second embodiment, the head body 101 is constituted by a first wall member 111 disposed on the recording sheet side of the head body, a second wall member 112 spaced apart from and opposite the first wall member 111, and a spacer member 113 interposed between the two wall members 111 and 112 to determine the size of the ink chamber 102 which, for example, has a 200 μm thickness, a 300 μm width and a uniform depth. In the head body 101, each of the first wall member 111 and the spacer member 113 is made of an insulating material such as glass, ceramic or the like. A slit 114 having a width of 100 μm, for example, corresponding to an image element is longitudinally formed in the top defining member 111. For example, the slit 114 is formed using an etching process with fluoro-acid or the like with a metal mask applied to a portion of the first wall member 111 other than that portion where the slit is to be formed. The second wall member 112 is made of an organic resistance film A. For example, a 30 μm thick conductive polyimide resin film containing about 48% by weight of carbon and having a volume resistivity of about 10 ohms/cm may be used as the organic resistance film.

The ink 103 is pressure-fed by an ink supply means (not shown) into the ink chamber 102 through an ink supply passage 115, so that the slit 114 is filled with the ink 103 by capillary action. In this embodiment, the ink 103 supplied to the ink chamber 102 may be conductive and have a volume resistivity not larger than $10^7$ ohms/cm. The viscosity of the ink 3 is established so as to have a value that is within a range from about 20 to about 300 cps at ordinary temperature (20° C.) but which is reduced substantially when heated (for example, at 200° C.).

The thermal energy applying means 104 is constituted by the organic resistance film A forming the second wall member 112, an array of spaced-apart current-conduction electrodes 121 each having a width of 50 μm and a length of 100 μm and being disposed corresponding to pel density (for example, 8 lines per miilimeter) on the outside surface of a belt-like portion 112A of the second wall member 112 along the slit 114, a common return electrode 122 on the inside surface of the second wall member 112, switching elements 123 connected to the respective current-conduction electrodes 121 and the return electrode 122 for the purpose of performing switching operations corresponding to image signals, and a current-conduction electric power source 124 connected in series to each of the switching elements 123. In this second embodiment, an insulating film 125 made $SiO_2$ or the like is provided between the second wall member 112 and portions of the respective current-conduction electrodes 121. Those portions of the electrodes 121 which are not opposite slot 114 are insulated from the belt-like portion **112*a* of the second wall member 112 since the insulating film 125 separates the electrodes from the film and limits contact between each of the current-conduction electrodes 121 and the organic resistance film A to locally heat the portion of film A opposite slit 114**.

The process of producing the current-conducting electrodes 121 and insulating film 125 will now be described in more detail. The process employed may comprise the steps of forming the insulating film 125 on one side surface of the organic resistance film A by sputtering, depositing a metal layer onto the organic resistance film A and the insulating film 125 through evaporation with metal such as Cr, Cu, Al, Au, or the like, forming the metal layer into current-conduction electrodes 121 of the above-described pattern through a photolithographic process applied to the metal layer, and depositing a conductive metal layer through evaporation onto the opposite side surface of the organic resistance film A to form the return electrode 122.

The electrostatic field producing means 106 is constituted by a conductive layer 131 which also serves as the return electrode 122, a roll-like electrostatic induction electrode 132 which is disposed at a predetermined distance apart from the surface of the ink 103 and which also functions as a surface for supporting the recording sheet 105, and an electrostatic induction electric power source 133 which is connected to the conductive layer 131 and the electrostatic induction electrode 132 for the purpose of forming an electrostatic field from the surface of the ink 103 to the electrostatic induction electrode 132. In this second embodiment, the electrostatic control pulse applied to the electrostatic induction electrode 132 from the electrostatic induction electric source 133 is generated in synchronism with the drive pulse for the thermal energy applying means 104.

Figure 7:
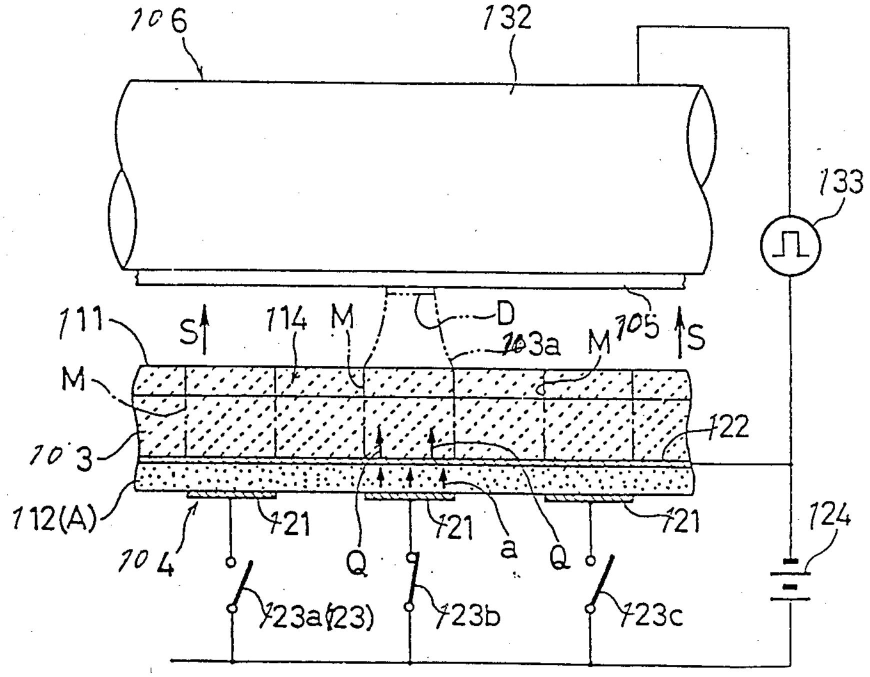
FIG. 7 is a sectional view taken along the line VII—VII of FIG. 5 and showing a process of ink-jet recording operation according to the embodiment.

In the second embodiment of the invention, the ink-jet recording apparatus operates as follows. When a selected one of the switching elements 123 turns on in response to an electrical signal corresponding to an image to be recorded, a current a flows in a part of the organic resistance film A between the corresponding current-conduction electrode 121 and the return electrode 122 as shown in FIG. 7. A part of the organic resistance film A electrically energized is heated to the desired temperature, so that a predetermined level of thermal energy Q is applied to the corresponding ink unit area M. Thus, the ink unit area M is heated. As a result, in the heated ink unit area M, the viscosity and the surface tension of the ink 103 are reduced and the conductivity is increased. When the electrostatic control pulse is applied to the electrostatic induction electrode 132 of the electrostatic induction producing means 106 in synchronism with the drive pulse for the thermal energy applying means 104, an electrostatic field S having a predetermined strength is established between the ink 103 facing the conductive layer 131 and the electrostatic induction electrode 132. Due to the electrostatic field S, the ink in the heated ink unit area M is jetted toward the recording sheet 105 passing in front of the electrostatic induction electrode 132. At this time, a protruding end portion of an ink column **103*a* caused by the jetting operation of the ink as shown by the virtual line of Fig. 7 touches the recording sheet 5, so that the ink 103 is transferred to the recording sheet 105. Thus, an ink dot D is formed on the recording sheet 105**.

In the recording operation in the second embodiment, the organic resistance film A has no member equivalent to a substrate for supporting an exothermic array. Accordingly, there is no possibility of the thermal energy generated from the organic resistance film A leaking to the substrate. Accordingly, the transmission efficiency of heat to the ink unit area M is improved compared with the conventional system using an exothermic array.

To establish the excellent results of this recording operation system, an experiment was conducted with an electrostatic control pulse of 1000 V/300 μm for 0.5 ms, which was generated in synchronism with the drive pulse of 5 V for 1.0 ms, corresponding to picture information. As a result, recording operations could be made stably at a frequency of 500 Hz. Furthermore, it was found that the electric power for the thermal energy was about 0.1 W per dot. For comparison, a recording experiment was carried out in the same manner with use of a conventional system using an exothermic array. The thermal energy electric power required was about 0.5 W per dot. Accordingly, it is apparent from the results of the two experiments that the ink-jet recording apparatus of this embodiment is improved in thermal transmission efficiency.

The head body unit U of the second embodiment, of the ink-jet recording apparatus can be produced using a process as follows. The ink-jet slit 114 is formed in the first wall member 111, while the current-conduction electrodes 112 and the return electrode 122 are formed on the organic resistance film A which serves as the second wall member 112. Both the constructed wall members 111 and 112 are attached to each other through the spacer member 113 with an epoxy adhesive or the like. In the thus constructed head body unit U, the belt-like portion 112A of the second wall member 112 functions as a heating element, so that the conventional step of cutting a substrate for arranging resistance heating elements at the edge portion thereof can be omitted. Furthermore, the roughness of the outside surface of the top defining member 111 can be reduced, so that the step of polishing the edge surface of the head body 101 can be omitted. Accordingly, the number of steps in the process of producing the head body unit U can be reduced compared with the prior art process. As a result, the production process can be improved. Furthermore, because the surface roughness of the edge surface of the head body 101 can be reduced, the meniscus of ink in the ink unit area M facing the slit 114 can be maintained in a stable condition.

In this second embodiment, the organic resistance film A constituting the second wall member 112 is made of a polyimide film having adequate strength and elasticity. Accordingly, if the organic resistance film A expands with heat or is deformed by a shock and/or a load, the deformation can be absorbed to a certain extent owing to its elasticity. As the result, when the stiff spacer member 113 and the second wall member 112 constituting the head body 101 are joined to each other with the adhesive, the seal and the adherence therebetween can be well maintained, and therefore the tightness of the ink chamber 102 can be maintained.

Although the second embodiment has been described as using an organic resistance film A made of a conductive polyimide film having predetermined conductivity and volume resistivity, the invention is not limited thereto, and, for example, the organic resistance film may be made of any suitable resin, for example, the polycarbonate resin film may be made about 20 $\mu$m thick contain 40% by weight of carbon and have a volume resistivity of 30 ohm/cm. The organic resistance film may be made of a polyester resin film of about 50 $\mu$m thick containing 20% by weight $SnO_2$ and having a volume resistivity of $3\times10^3$ ohm/cm. In either case, the same result can be attained.

Although the second embodiment has been described with the slit 114 used to form jet-orifices for jetting ink, the invention is not limited thereto, and holes corresponding to pel density may be used such as described for the first embodiment. Alternatively, the positional relation between the current-conduction electrodes 121 and the return electrode 122 may be reversed, or the return electrode may be formed with the same pattern as the current-conduction electrodes 121. Further alternatively, the conductive layer 131 of the electrostatic field producing means 106 and the return electrode 122 of the thermal signal applying means 104 may be separate electrodes.

As described above, the ink-jet recording apparatus according to the present invention has the following benefits, while using the innate advantages in the thermal electrostatic ink-jet system. First, because orifices for jetting ink are provided in the organic resistance film constituting a part of the head body, and the edge portions of the orifices are selectively, electrically heated so as to directly heat the ink unit area, a direct thermal transmission path is provided. Therefore, thermal energy losses to the substrate can be reduced so that the thermal transmission efficiency to ink can be improved compared with the conventional system in which a heating element array is provided on a substrate.

Secondly, in producing the head body unit, not only can the orifice edge portion of the organic resistance film constituting the head body be easily constructed as a heating portion, but also the end surface of the head body can be made smooth with no polishing step required. Accordingly, compared with the conventional system in which a heating element array is provided on a substrate with the intention of stabilizing the recording operation, the production steps can be reduced, and the efficiency of producing the head body unit can be improved.

Thirdly, the second wall member of the head body is made of an organic resistance film which is selectively electrically heated so that the ink unit area is directly heated. Accordingly, compared with the conventional system in which an array of heating elements is provided on a substrate, the loss in thermal energy transmitted to the substrate or the like can be reduced to improve the thermal transmission to ink.

What is claimed is:

1. A thermal electrostatic ink-jet recording apparatus comprising:

(a) a recording head body having an orifice side and a back side;

(b) first and second spaced apart wall members in said body defining an ink chamber for accommodating ink therein, said first wall member being on said orifice side and said second wall member being on said back side of said head body, and one of said wall members comprising an electrically conductive organic resistance film;

(c) orifice means in one of said wall members in flow communication with said chamber for jetting ink therefrom;

(d) thermal energy applying means for applying thermal energy to selected portions of said ink adjacent said orifice means in response to image signals, including a plurality of spaced apart electrical current conducting electrodes in contact with said film to pass an electric current through said film and thereby heat selected areas of said ink in response to image signals; and (e) electrostatic field applying means for applying an electrostatic field between said ink and a recording sheet to jet said ink from said orifice means.

2. The ink-jet recording apparatus of claim 1, in which said organic resistance film is made of a conductive film selected from the group consisting of polyimide, polyamide, polysulfone, polyphenyl oxide, polycarbonate, polyester and fluorinated polymer resins.

3. The ink-jet recording apparatus of claim 1, wherein said electrodes are pairs of electrodes arrayed on said film, each of said pairs comprising a first electrode on one side of said organic resistance film and a second electrode on the other side of said organic resistance film.

4. The ink-jet recording apparatus of claim 3, wherein a portion of each of said electrodes is in direct electrical contact with said film and the remainder of each of said electrodes is electrically insulated from said film.

5. The ink-jet recording apparatus of claim 3, in which said orifice means comprises a plurality of spaced-apart holes through said film.

6. The ink-jet recording apparatus of claim 3, in which said orifice means comprises a slit in said film.

7. The ink-jet recording apparatus of claim 3, wherein said first wall member comprises said organic resistance film having said orifice means located therein and said electrodes are in contact with said film adjacent said orifice means.

8. The ink-jet recording apparatus of claim 3, wherein said second wall member comprises said film; and said orifice means is located in said first wall member.

9. The ink-jet recording apparatus of claim 8, wherein said orifice means comprises a slit formed in said first wall member and said electrodes are arrayed on said film and each has a portion opposite said slit in direct contact with said film while the remainder of each of said electrodes is insulated from said film.

10. The ink-jet recording apparatus of claim 8, wherein said film comprises a conductive resin selected from the group consisting of polyimide, polyamide and polyester resins.

11. The ink jet recording apparatus of claim 7, wherein said film comprises a conductive resin selected from the group consisting of polyimide, polycarbonate, and polyester resins.

12. The ink jet recording apparatus of claim 5, wherein said electrodes are each comprised of (1) an annular portion disposed around one of said holes and directly contact said film and (2) a linear portion extending from said annular portion and insulated from said film.

* * * * *